D. LANE.

Improvement in Head-Blocks for Saw-Mills.

No. 5,048. Reissued Sep. 3, 1872.

WITNESSES.

Villette Anderson.

Geo. E. Upham.

INVENTOR.

Dennis Lane.

Chipman & Osmun & Co.,

Attys.

AM. PHOTO-LITHOGRAPHIC CO. N.Y. (OSBORNE'S PROCESS.)

UNITED STATES PATENT OFFICE.

DENNIS LANE, OF MONTPELIER, VERMONT, ASSIGNOR TO HIMSELF, PERLEY P. PITKIN, AND JAMES W. BROCK.

IMPROVEMENT IN HEAD-BLOCKS FOR SAW-MILLS.

Specification forming part of Letters Patent No. 80,491, dated July 28, 1868; reissue No. 5,048, dated September 3, 1872.

*To all whom it may concern:*

Be it known that I, DENNIS LANE, of Montpelier, county of Washington and State of Vermont, have invented a new and useful Improvement in Head-Blocks for Saw-Mills; and do hereby declare the following to be a full, clear, and exact description of the same, reference being had to the accompanying drawing forming part of the same, and letters of reference marked thereon.

This invention has relation to saw-mill carriages in which the slide or bar carrying the upright supports is moved across and upon the head-blocks by the action of reciprocating oblique guides fixed to a rack-bar; and it consists in giving to the reciprocating oblique guides an oblique movement across the carriage and at the same time in the direction of its length, whereby a reduplication of said oblique guides, running parallel with each other and operating in succession, may be employed; in arranging the oblique reciprocating guides above and upon the head-blocks, and directly in rear of the slide or bar which carries the upright supports, whereby the capacity of the saw-mill is increased and the tendency to bind in the sliding knees diminished; in attaching the operating pinion, which engages with the rack of the oblique traversing frame, directly to the slide or bar which carries the upright supports; in a peculiarly-formed strap for confining the oblique traversing frame to the slide-bar, whereby evenness of movement is secured with a firm bearing for the log; in the manner of hinging and swiveling the handle by which the pinion-shaft is operated, whereby the convenience of the operator is promoted; and the other improvements hereinafter referred to.

Figure 2:
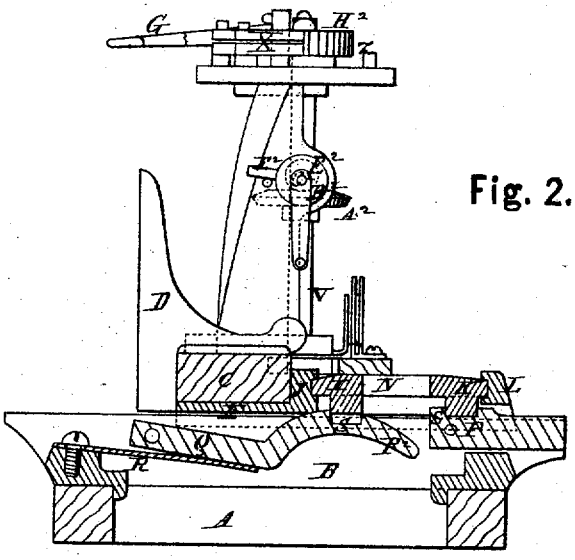
Figure 1:
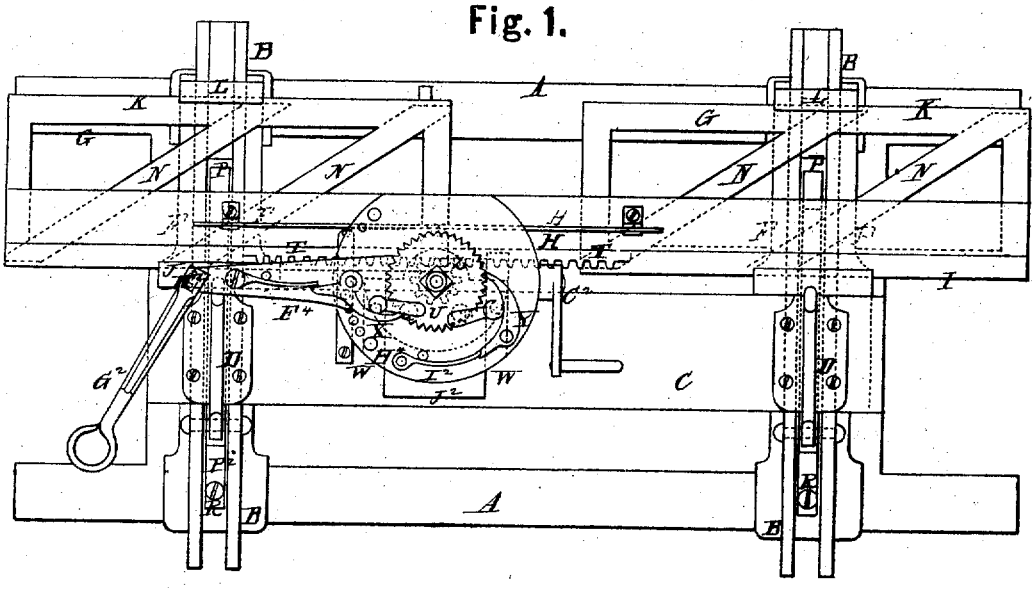

In the accompanying drawing, Figure 1 represents a plan view of a saw-mill carriage with my improvement attached. Fig. 2 represents a transverse vertical section thereof.

The letter A represents the frame of the carriage, which may be of the usual form and construction. B indicates the head-blocks or cross-ties fixed on said carriage. C designates the slide-bar connecting the upright supports D, which form bearings against which the saw-log rests. To the under side of this slide-bar are secured the plates E, which are provided with downwardly and inwardly turned lips or flanches F to engage with grooves formed in the sides of the head-blocks, near the upper edges, thus giving to said bar a steady and even sliding movement. G indicates obliquely-moving frames, which are connected by a bar or rail, H, provided with a rack, T. The frames G, with their connecting-bar H, are placed upon the head-blocks, in rear of the slide-bar C, and form a reciprocating sliding frame, which is guided in its movement by the lips J L of the plates E, which lips are turned upwardly and inwardly, and lie at right angles with the lips F on the under side of said plates above mentioned. Between these lips or flanches J and L the guide-frames G move when operated. Each of the frames G is provided with oblique bars N, parallel with each other and extended below the plane of the under surface of said frames to engage with the oblique grooves or notches of the head-blocks, which are preferably formed in separate pieces or blocks P $P^2$, which are set into recesses formed in the head-blocks for this purpose. The blocks P which are furthermost to the rear are usually fixed, while the others, $P^2$, are attached to springs R or otherwise arranged to be susceptible of depression as the frames G ride over them. With these grooves or ways of the blocks P $P^2$ the oblique bars of the frames G become successively engaged, when such frames are moved by the action of the pinion U, which engages with the rack. The frames G therefore move in the direction of their oblique bars N, which serve as guides to give the frames a forward and backward movement, and at the same time a movement in the direction of the length of the carriage. For operating the traversing-rack and its guide-frames an upright shaft, V, turning in bearings in the upright post or standard W secured to the slide-bar C, is provided with a pinion, U, which engages with the rack T, so that, by turning said shaft V, the bar H with its oblique guide-frames will be moved through the guide-notches S of the head-blocks. For operating the ratchet-wheel Z of the shaft V to throw the slide-bar forward an arrangement of pawls, X Y, is provided, but this arrangement of mechanism forms no part of my present invention. For moving the shaft V to throw the slide-bar back a gear-wheel, $A^2$, is fixed to said shaft, within the post or upright W, which is recessed for this purpose. With this gear-wheel a pinion, $B^2$, secured to a horizontal shaft, $C^2$, having its bearings in the post W, is arranged to engage, said shaft $C^2$ being provided with a handle. This shaft is hung by a sleeve or collar, $E^2$, eccentric therewith, within the standard W, so that by turning such collar the pinion $B^2$ can be thrown into or out of connection with the main gear $A^2$ of the vertical shaft.

The operating pawls X, hereinbefore referred to, are carried by an arm, $F^4$, which is operated by means of a handle-lever, $G^2$, at its outer end. This handle-lever $G^2$ is hinged to a block, $H^2$, swiveled in the arm $F^4$, by which arrangement it not only admits of being swung around for use, either on the rear or on the front side of the carriage, as may be desired, but also has a swinging motion upon the arm $F^4$, to which it is hung, as such arm moves toward the operator, the convenience of which is obvious. The post W consists of two parallel uprights, $H^4$, connected at their upper ends by a plate, $I^2$, on which operating devices for the vertical shaft V are arranged, and at their lower ends by a plate, $J^2$, fastened to the slide-bar C. While room is afforded for the gear-wheel $A^2$ by this construction of the standard W, the sides of the standard are at the same time braced and stiffened to secure the requisite firmness for sustaining the action of the operating parts carried by said standard. The shaft V is attached to the slide-bar C to enable the operator to govern the operating devices conveniently, and at the same time to allow of the backward-and-forward movement of the traversing-rack and its guide-frames G. The frames G are arranged above the head-blocks to give capacity to the saw-mill and to bring the said frames directly in rear of the slide-bar C, so that they will have a square bearing on said slide-bar, whereby the tendency to bind in the knees is obviated.

The adoption of the oblique movement of the guide-frames permits, in the construction, of the reduplication of the oblique guide-bars N, whereby said frames are brought within narrow limits and into compact form, and weight and friction are decreased. As the oblique rack-frame follows the slide-bar up in its movement, I am enabled to attach the power-shaft with its pinion and operating devices directly to the slide-bar.

What I claim as my invention, and desire to secure by Letters Patent, is—

1. The combination, with a series of notched guides arranged in line in the same head-block, of reciprocating-frames G, having parallel oblique bars N for successive engagement with said notched guides, substantially as specified.

2. In a saw-mill, the arrangement of the obliquely-moving reciprocating frames G above the surfaces of the head-blocks and directly in rear of the slide-bar which carries the upright supports, substantially as specified.

3. The obliquely-moving reciprocating guide-frame G, having a series of parallel oblique guides, N, substantially as specified.

4. The combination, with the slide-bar C, carrying the operating pinion U of the reciprocating rack-frame, moving backward and forward with the slide-bar, substantially as specified.

5. The combination, with a slide-bar having the bearings J L, of a reciprocating frame moving on oblique guides N, substantially as specified.

6. The grooved block P and the yielding grooved block $P^2$, arranged in line in the same head-block and successively engaged by the parallel oblique guides N of the reciprocating-frame, substantially as specified.

7. The sleeve $E^2$, having an eccentric bushing in the post W for the pinion $B^2$, by which said pinion is thrown into or out of gear with the wheel $A^2$, substantially as specified.

In testimony that I claim the above I have hereunto subscribed my name in the presence of two witnesses.

DENNIS LANE.

Attest:
MAHLON TAPLIN,
ALBERT D. LANE.